US005699254A

United States Patent [19]

Abate et al.

[11] Patent Number: 5,699,254

[45] Date of Patent: Dec. 16, 1997

[54] ELECTRONIC SYSTEM FOR CALCULATING INJECTION TIME

[75] Inventors: Maurizio Abate, Bologna; Claudio Carnevale, Nole Canavese; Cosimo De Russis, Chieri; Luca Poggio, Spinetta Marengo; Gabriele Serra, S. Lazzaro di Savena, all of Italy

[73] Assignee: Magneti Marelli S.p.A., Italy

[21] Appl. No.: 397,386

[22] Filed: Mar. 2, 1995

[30] Foreign Application Priority Data

Mar. 4, 1994 [IT] Italy .................................. TO94A0152

[51] Int. Cl.[6] .......................... G01M 15/00; F02O 41/04

[52] U.S. Cl. .......................... 364/431.053; 364/431.051; 364/431.052; 364/431.04; 123/493; 123/492; 123/488

[58] Field of Search .................................. 123/493, 480, 123/488, 492; 364/431.051, 431.052, 431.053, 431.04, 431.05

[56] References Cited

U.S. PATENT DOCUMENTS

| | | | |
|---|---|---|---|
| 4,359,993 | 11/1982 | Carlson | 123/492 |
| 4,411,235 | 10/1983 | Shinoda et al. | 123/488 |
| 4,637,364 | 1/1987 | Abe et al. | 123/492 |
| 4,667,640 | 5/1987 | Sckozawa et al. | 123/492 |
| 4,792,905 | 12/1988 | Sekozawa et al. | 364/431.053 |
| 4,919,094 | 4/1990 | Manaka et al. | 123/826 |
| 4,939,658 | 7/1990 | Sckozawa et al. | 364/431.06 |
| 5,255,655 | 10/1993 | Denz et al. | 123/474 |

FOREIGN PATENT DOCUMENTS

| | | |
|---|---|---|
| 0 134 547 | 3/1985 | European Pat. Off. . |
| 0 152 019A3 | 8/1985 | European Pat. Off. . |
| 0 582 085A2 | 2/1994 | European Pat. Off. . |
| 02 157 451 | 8/1990 | Japan . |
| WO 90/07053 | 6/1990 | WIPO . |

OTHER PUBLICATIONS

International Search Report corresponding to EPO Application No. 95 10 2976 Jun. 14, 1995.

*Primary Examiner*—Kevin J. Teska
*Assistant Examiner*—Herbert McNair
*Attorney, Agent, or Firm*—Baker & Daniels

[57] ABSTRACT

Electronic system for calculating injection time in which an electronic unit with microprocessor receives as input a multiplicity of signals measured in the engine and a signal proportional to the engine load, for example a signal generated by a pressure sensor arranged in the intake manifold of the engine. The electronic unit comprises a circuit for compensating for the delay times due to the response inertia of the engine load sensor, the conditioning (filtering, conversion and processing) of the load signal and physical actuation of the injection. The electronic unit also comprises a circuit for the dynamic compensation of the "film/fluid" effect.

13 Claims, 5 Drawing Sheets

ELECTRONIC SYSTEM FOR CALCULATING INJECTION TIME

BACKGROUND OF THE INVENTION

The invention relates to an electronic system for calculating injection time.

Electronic systems for calculating injection time are known in which an electronic unit with microprocessor receives as input a multiplicity of data signals coming from the engine (such as signals proportional to the position of the throttle valve, the temperature of the air taken into the engine, the temperature of the water in the engine's cooling system, the number of engine revolutions etc.).

In particular, the electronic unit receives as input a signal which is a measure of the engine load, such as a signal generated by a pressure sensor arranged in the engine's intake manifold, and processes that engine load signal together with the other data signals, generating as output an injection time for the control of the injectors.

The measurement of the engine load may also be obtained by using a signal which is a measure of the pressure in the intake manifold, or by means of a signal which is a measure of the quantity of air inside the manifold or by means of a signal which is a measure of the position of the throttle valve.

The calculation systems of known type have a response delay due to the inertia of response of the engine load sensor, the delay times introduced by the conditioning of the engine load signal (filtering, conversion and processing) and the delay introduced by the physical actuation of the injection.

For this reason, the calculation of the injection time during the transients is not generally correct and is carried out using an engine load value which does not correspond to the true engine load value present in the engine itself.

The engines also have a physical phenomenon, known as the "film/fluid" effect, which causes a number of disadvantages in the course of the transients.

The injectors inject the petrol inside the manifold in the form of small drops which are transported by the flow of air taken in into the combustion chamber. In the course of transport the drops which are larger and of less volatile composition are deposited on the internal walls of the manifold forming a layer or "film" of petrol. Because of the high temperature of the manifold some of this petrol film evaporates, in ways which essentially depend on the operating point of the engine and the temperature of the manifold, going on to combine with the air/petrol mixture entering the combustion chamber.

In a situation of stationary state there is an equilibrium between the flow of petrol supplied by the injectors and the thickness of the petrol film but in the course of the operating transients of the engine (accelerations, decelerations) the increase or decrease of this film causes the quantity of petrol entering the combustion chamber to be different from that actually injected, creating effects which are detrimental to the engine's exhaust gases (increase in pollutant gases), the efficiency of the catalyzer and the drivability of the vehicle and increasing the petrol consumption.

There are injection systems which provide for the compensation of the dynamic "film/fluid" effect in the course of the transients; these systems use methods which are substantially empirical, by means of which it is possible to add/subtract pre-determined quantities of petrol in the course of fuel injection in order to compensate for the variation in fuel due to the "film/fluid" variation.

There are also systems for compensating for the dynamic "film/fluid" effect which use mathematical models (algebraic equations for example) to calculate the quantity of petrol which should be added/subtracted in the course of the engine operation transients.

The known types of compensation systems use extremely complex mathematical algorithms or are difficult to calibrate.

SUMMARY OF THE INVENTION

The object of the invention is to produce an injection system which compensates for the dynamic "film/fluid" variations in the course of the transients in a simple way and which at the same time compensates for all the system's delay times.

This object is achieved by the invention in that it relates to an electronic system for calculating injection time comprising:

- an electronic unit receiving as input a multiplicity of data signals (N, $T_{H2O}$, Pfarf, Taria) measured in an endothermic engine;
- the said electronic unit receiving as input a signal which is a measure of the engine load (P) generated by an engine load sensor;
- the said electronic unit being capable of generating an injection time (Tjeff) for a multiplicity of injectors;

characterized in that the said electronic unit comprises reconstructive means receiving as input the said engine load signal (P) together with at least some (N, $T_{H2O}$) of said data signals;

- the said reconstructive means being capable of generating as output a signal which is a measure of the correct engine load (Pric) which compensates for the response delays of the said engine load sensor, the system processing delays and the delays due to the actuation of the injection;
- the said reconstructive means being capable of supplying the said correct engine load signal (Pric) to electronic calculation means generating as output an intermediate injection time (Tjin);

the said electronic unit also comprising electronic means of compensation for dynamic "film/fluid" variation receiving as input the said intermediate injection time (Tjin) and generating as output a correct injection time (Tjcorr); the said electronic means of compensation for dynamic "film/fluid" variation comprising means capable of compensating for the variation in the mixture supplied to the combustion chamber due to the dynamic variation of the layer of fuel ("film/fluid") deposited on the walls of the intake manifold.

BRIEF DESCRIPTION OF THE DRAWINGS

The invention will now be illustrated with particular reference to the accompanying drawings which show a non-exhaustive preferred embodiment and in which.

DETAILED DESCRIPTION OF THE INVENTION

Figure 1:
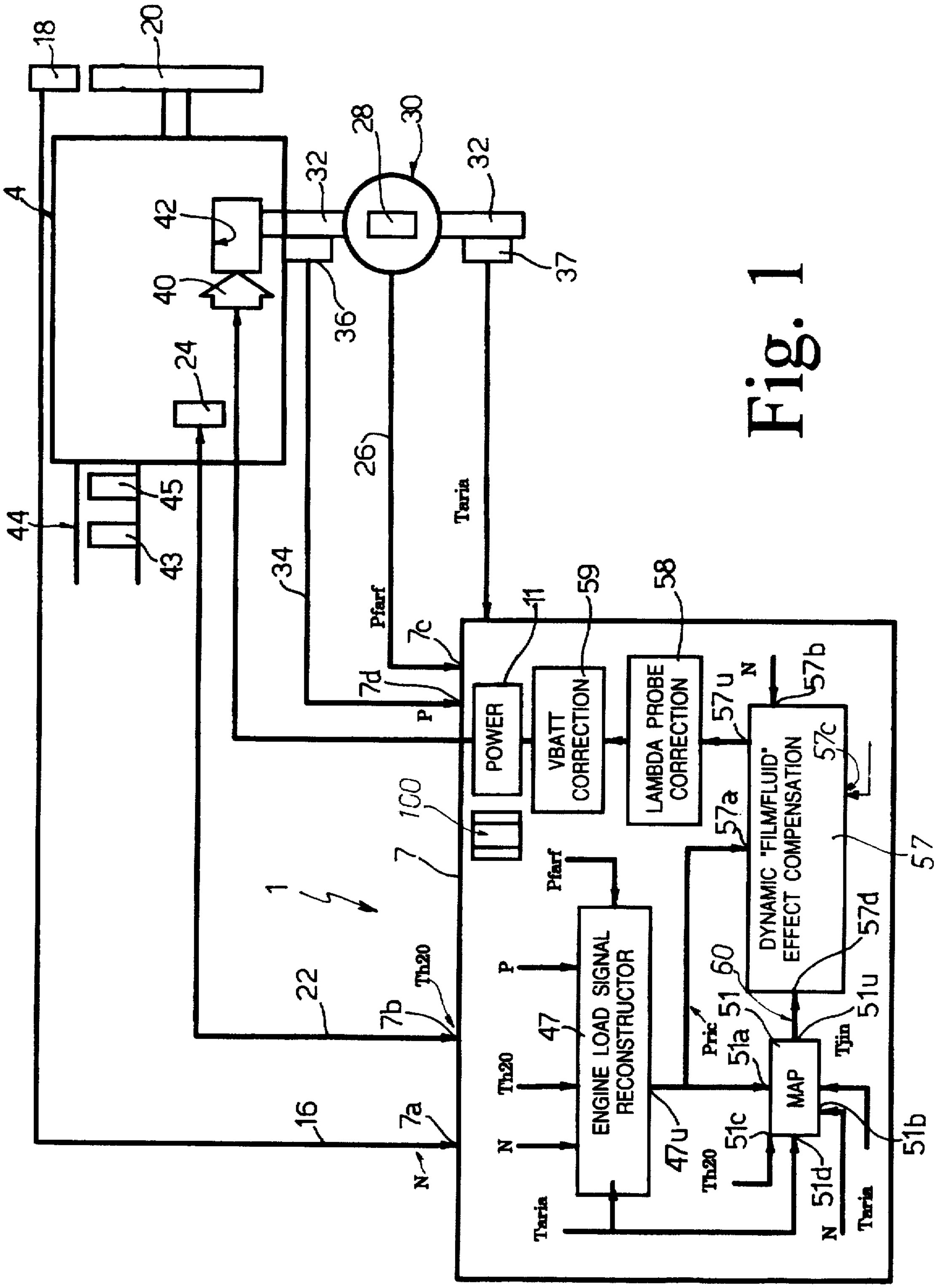
FIG. 1 shows in diagrammatic form an endothermic engine provided with an electronic system for calculating the injection time produced according to the specifications of the invention.

In FIG. 1, 1 denotes, in its entirety, an electronic system for calculating the injection time for fuel supplied to an endothermic engine 4, particularly a petrol engine (shown in diagrammatic form).

The system 1 comprises an electronic unit with microprocessor 7 which receives a multiplicity of data signals coming from the engine 4.

In particular the electronic unit 7 has a first input 7a which is connected via a line 16 to a sensor 18 for N revolutions coupled to the flywheel 20 of the engine 4.

The electronic unit 7 has a second input 7b which is connected via a line 22 to a sensor 24 capable of measuring the temperature $T_{H2O}$ of the cooling fluid of the engine 4.

The electronic unit 7 also has a third input 7c which is connected by means of a line 26 to a sensor 28 (conveniently in the form of a potentiometer) capable of measuring the position Pfarf of a throttle valve 30 arranged at the inlet of the intake manifold 32 of the engine 4.

The electronic unit 7 has a fourth input 7d which is connected by means of a line 34 to a pressure sensor 36 arranged along the intake manifold 32 downstream of the throttle valve 30 and capable of measuring the pressure P of the air taken into the manifold 32. The electronic unit 7 also receives as input the signal generated by a sensor 37 capable of measuring the temperature Taria of the air taken into the intake manifold 32.

The fuel injection device also comprises a power circuit 11 which receives as input an injection time Tjeff calculated by the unit 7 and controls a multiplicity of injectors 40 (only one of which is shown for reasons of simplicity) capable of injecting fuel into respective combustion chambers 42.

The electronic unit 7 also cooperates with a probe of oxygen content of the mixture on exhaust, for example a lambda probe 43 arranged in the exhaust manifold 44 of the engine 4 or a linear oxygen probe 45, for example a U.E.G.O. (UNIVERSAL EXHAUST GAS OXYGEN) probe arranged in the exhaust manifold 44.

According to the invention the electronic unit 7 comprises engine load signal reconstructive circuit 47 which receives as input the signals N, $T_{H2O}$, Pfarf, P, Taria generated by the respective sensors 18, 24, 28, 36 and 37 and has an output 47u communicating with a first input 51a of a circuit 51 for calculating the injection time.

As will be described in greater detail below, the engine load signal reconstructive circuit 47 processes the signals N, $T_{H2O}$, Pfarf, P, Taria present at its inputs and generates as output a signal Pric which represents an (estimated) value of the engine load signal (particularly the pressure signal) which anticipates the response delays of the sensor 36, the processing delays of the unit 7 and the injection actuation delays.

The calculation circuit 51 has a second, a third and a fourth input 51b, 51c, 51d which are connected to the sensors 18, 24 and 37 respectively and receive the signals N, $T_{H2O}$ and Taria.

The circuit 51 is capable of calculating an injection time Tjin which is supplied to an output 51u of the circuit 51, in known manner (by means of electronic tables, for example), on the basis of the signals Pric, N, $T_{H2O}$, Taria present at its inputs 51a, 51b, 51c and 51d.

According to the invention the unit 7 also comprises a circuit 57 for compensating for the dynamic "film/fluid" variation which has inputs 57a, 57b, 57c which receive the signals Pric, N, $T_{H2O}$, Taria generated by the circuit 47 and the sensors 18 and 24.

The circuit 57 also has an input 57d which is connected via a line 60 to the output 51u of the circuit 51 and receives the injection time Tjin.

As will be explained below, the circuit 57 modifies the input injection time Tjin by means of the signals Pric, N, $T_{H2O}$, Taria, compensating for the dynamic "film/fluid" variation and generating in one of its outputs 57u a correct injection time Tjcorr which is supplied to a first corrector circuit 58 (of known type) which modifies the injection time Tjcorr on the basis of the reaction signal generated by the lambda probe 43.

The corrector circuit 58 generates as output a correct injection time Ticorr-lambda which is supplied to a second corrector circuit 59 (of known type) which modifies (in known manner) the injection time Tjcorr-lambda on the basis of a battery voltage signal Vbatt.

The corrector circuit 59 generates as output a correct injection time Tjeff which is supplied to the power circuit 11 which controls the injectors 40.

Figure 2A:
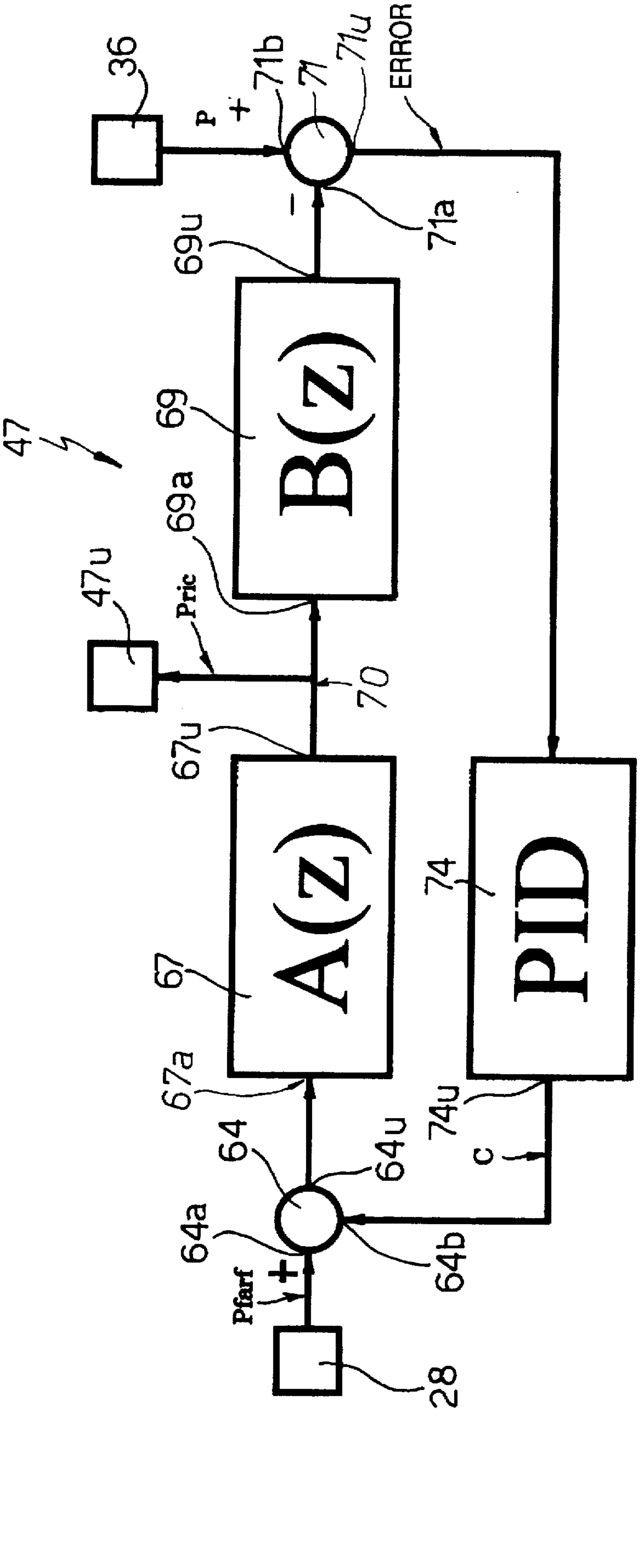
FIGS. 2*a* and 2*b* show details of the system in FIG. 1.
Figure 2B:
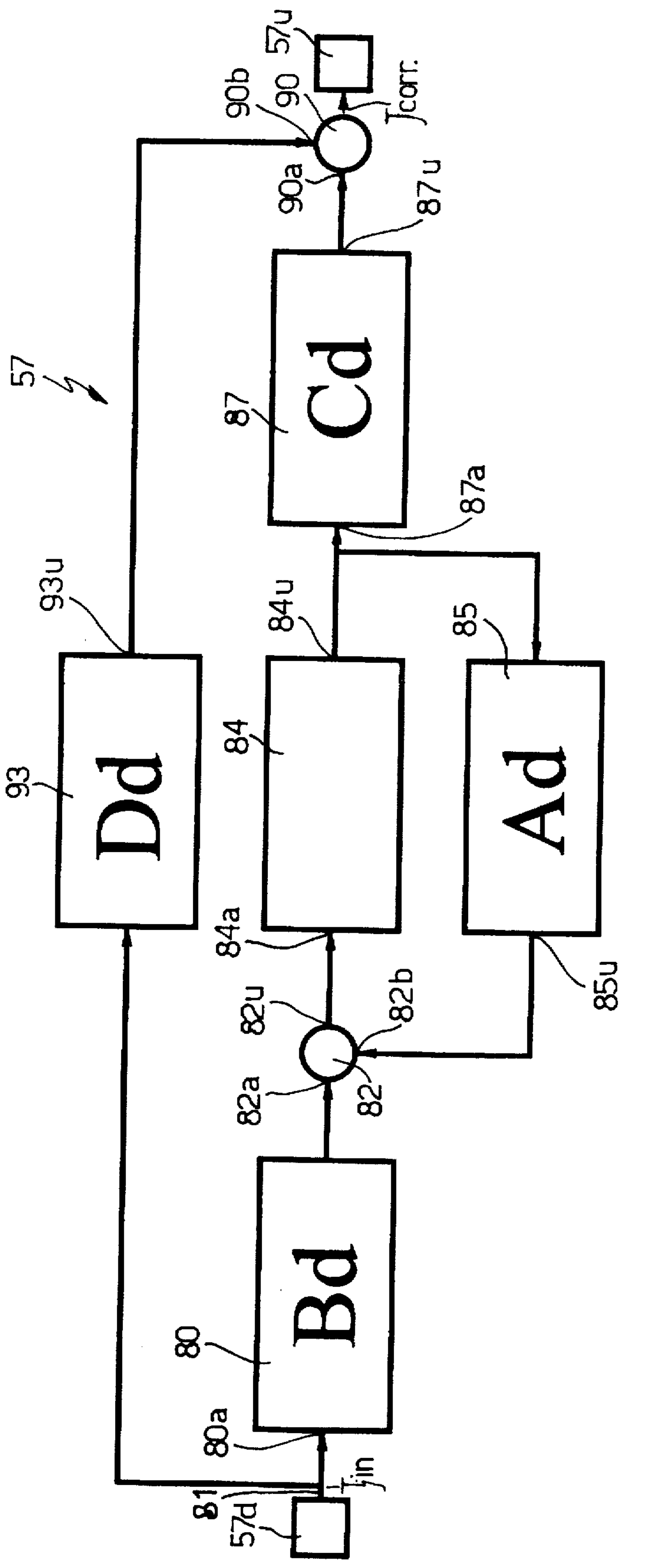
Figure 3A:
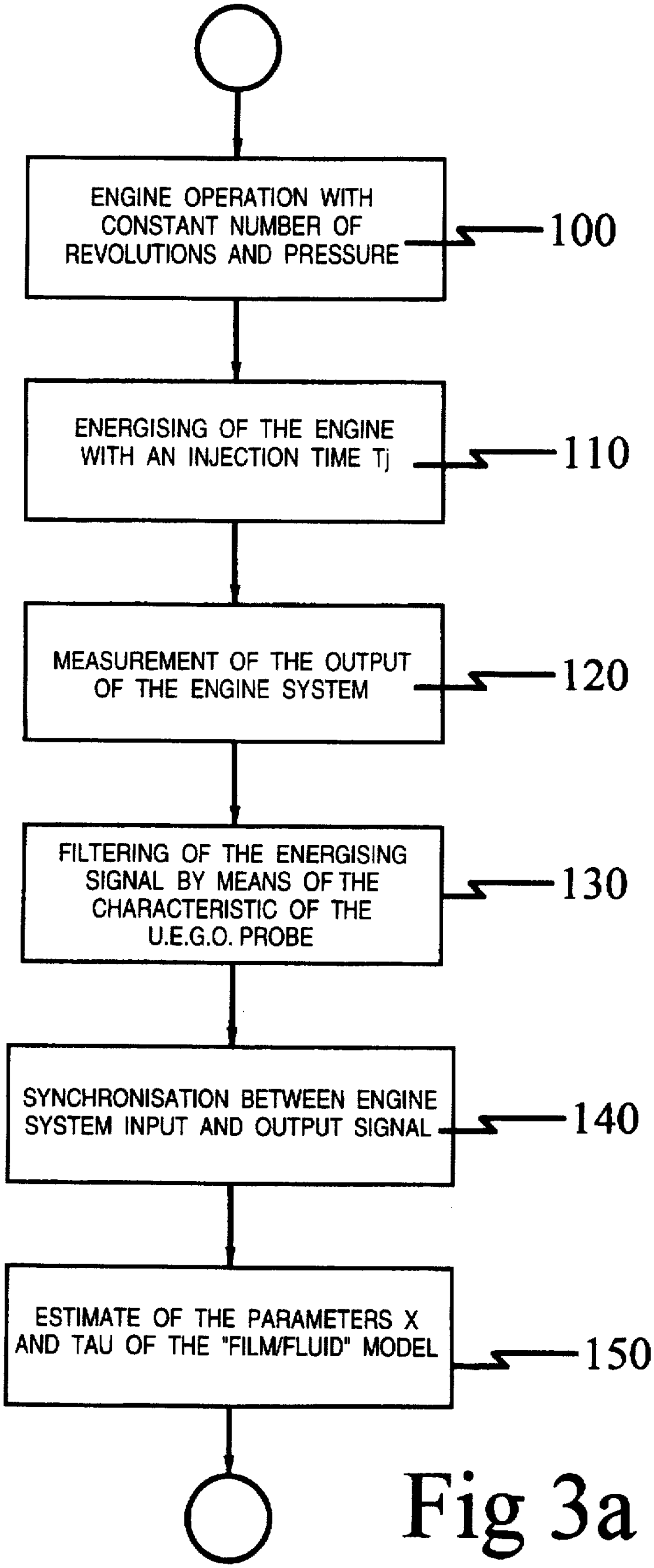
FIGS. 3*a* and 3*b* show particular processing functions performed by the system according to the invention.
Figure 3B:
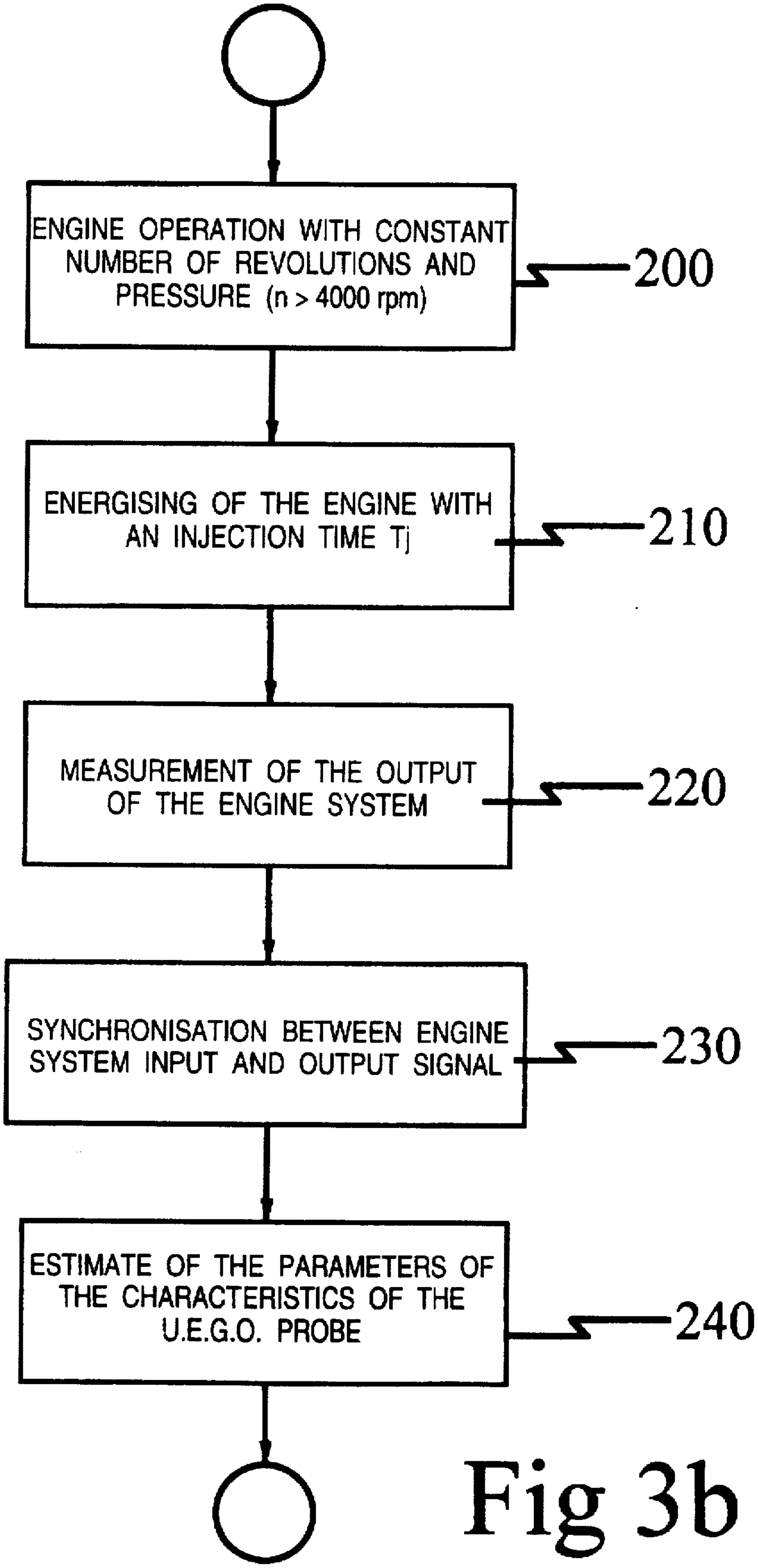

The engine load signal reconstructive circuit 51 is described with particular reference to FIG. 2a.

The circuit 51 comprises an adder node 64 which has a first adder (+) input 64a which receives the signal Pfarf generated by the sensor 28 and an output 64u connected to an input 67a of a circuit 67. The circuit 67 performs a transfer function A(z) which models a means of transmission, particularly the portion of intake manifold 32 between the throttle valve 30 and the sensor 36. The transfer function A(z) is conveniently implemented by means of a digital filter, particularly a low-pass filter, the coefficients of which are a function of the signals N, $T_{H2O}$, Taria generated by the sensors 18, 24 and 37.

The circuit 51 also comprises a circuit 69 which has an input 69a connected to an output 67u of the circuit 67 via a line 70. The line 70 communicates with the output 47u of the circuit 47. The circuit 69 performs a transfer function B(z) which models the delays of the engine load sensor 36, the signal conditioning delays (filtering, conversion and processing of the engine load signal) and the delays due to the physical actuation of the injection.

The transfer function B(z) is conveniently implemented by means of a digital filter, particularly a low-pass filter, the coefficients of which are a function of the signals N, $T_{H2O}$, Taria generated by the sensors 18, 24 and 37.

The circuit 69 has an output 69u which is connected to a first subtractor input 71a of a node 71 which also has a second adder input 71b to which the engine load signal used in the unit 7 and comprising all the delays of the system is supplied.

The adder node 71 also has an output 71u which is connected to an input of a correction circuit 74, conveniently formed by a proportional-integral-derivative (P.I.D.) network which has an output 74u which communicates with a second input 64b of the node 64.

In practice, the circuit 67 receives as input the signal Pfarf corrected with a correction signal C generated by the circuit 74 and generates as output a signal which estimates the pressure in the intake manifold 32 in the vicinity of the pressure sensor 36. The signal Pric outputted to the circuit 67 is then supplied to the circuit 69 which outputs an engine load signal including the response inertia of the sensor 36, the delays of the system and the actuation delays. The output signal of the circuit 69 is then compared with the (true) engine load signal so that at the output of the node 71 there is an error signal which is subsequently processed by the circuit 74 which in its turn outputs the signal C.

Because of the retro-action carried out by the circuit 74 the error signal is minimized and the Pric signal at the output of the circuit 67 thus represents the measurement of the engine load minus the delays of the sensor 36, the delays of the calculation system and the actuation delays.

The correct engine load signal Pric is then taken from the line 70 and is supplied to the circuits 51 and 57 which generate as output the injection time Tjin.

The circuit 57 which modifies the injection time Tjin calculated by the circuit 51 by compensating for the dynamic "film/fluid" variation will be described with particular reference to FIG. **2*b***.

The circuit 57 comprises a first circuit 80 which has an input **80*a* communicating with the input 57*d* by means of a line 81 and an output connected to a first input 82*a* of an adder node 82. The adder node 82 has an output 82*u* communicating with an input 84*a* of a circuit 84**.

The circuit 84 has an output **84*u* which communicates with an input of a circuit 85 having an output 85*u* connected to a second input 82*b* of the node 82**.

The output **84*u* of the circuit 84 is also connected to an input 87*a* of a circuit 87 having an output 87*u* connected to a first input 90*a* of a node 90**.

The node 90 also has a second input **90*b* which is connected to an output 93*u* of a circuit 93 having an input connected to the line 81**.

The circuits 80, 85, 87 and 93 respectively produce multiplication coefficients Bd, Ad, Cd and Dd which are updated according to the signals N, $T_{H2O}$, Taria, Prig detected by the sensors 18, 24, 37 and by the pressure reconstructor.

The circuit 84 produces a delay of unitary duration, equal to a sampling step, to the digital signal supplied to its input **84*a***.

The circuit 57 performs a transfer function which compensates for the dynamic variations of the "film/fluid" layer of fuel on the walls of the manifold.

In particular the dynamic "film/fluid" variations can be represented in the continuum according to a system of two equations, of the following type:

$$dmff/dt=(1/tau)*(X*mfi-mff) \quad [1]$$
$$mfe=(1-X)*mfi+mff$$

where mfi represents the quantity of fuel physically supplied by the injector 40, mfe the quantity of fuel actually introduced into the combustion chamber 42, mff represents the quantity of fuel which evaporates from the "film" layer deposited on the walls of the manifold, X the percentage of fuel which is deposited on the walls of the manifold and tau the time constant of evaporation from the fuel "film" deposited on the manifold.

The system [1] is described in the article entitled "S.I. ENGINE CONTROLS AND MEAN VALVE ENGINE MODELLING" by Elbert Hendricks, S. C. Sorenson published in the SAE 910258 publication in 1991.

After having developed the system [1] according to the Laplace transform, the system [1] can be re-written as a transfer function H(s), of the zero pole type, which describes the physical input/output system which represents the dynamic "film/fluid" effect.

To compensate for the dynamic film fluid effect it is therefore necessary to produce a transfer function $H(s)^{-1}$ which is inverse to the transfer function H(s), i.e. the unitary transfer function $H(s)^{-1}*H(s)=I(s)$.

In discrete terms the circuit 57 thus performs the transfer function $H(s)^{-1}$ which compensates for the dynamic film/fluid variation.

In particular the transfer function implemented by the circuit 57 is of the following type:

$$output=Dd*(input)+Cd*(Bd/(Z-Ad))*(input) \quad [2]$$

where Bd, Ad, Cd and Dd are the coefficients defined as:

$$Ad=[1-polofi*DT];$$
$$Bd=[X*polofi*DT]/[1-X]; \quad [3]$$
$$Cd=[-1];$$

and $$Dd=[1]/[1-X]$$

where polofi is defined as [1]/[tau*(1−X)], DT represents the sampling step and Z the unitary delay produced at the block 84.

The coefficients [3] can be obtained by inverting the transfer function H(s) of the system [1] and re-writing the inverse system in the form:

$$M=A*V+B*U \quad [4]$$
$$Y=C*V+D*U$$

where U represents the input of the system, Y the output of the system, V the state of the system with:

$$A=-polofi$$
$$B=X*polofi/(1-X)$$
$$C=-1; \quad [5]$$

and $$D=1/(1-X)$$

By discretizing [5] with a known technique it is possible to obtain the expressions [3] as preferential solutions.

In this way, the circuit 57 receives as input the injection time Tjin and thus generates an output injection time Tjcorr according to [2], i.e.:

$$Tjcorr=Dd*(Tjin)+Cd*(Bd/(Z-Ad))*(Tjin)$$

Since the injection time is proportional to the quantity of fuel injected it is evident how the circuit 57, in its entirety, enables the injection time to be modified by calculating a quantity of fuel which compensates for the dynamic variation of fuel supplied to the combustion chamber as a result of the "film/fluid" effect.

The way in which the values of X and of tau are obtained experimentally will now be described with the aid of FIGS. **3*a* and 3*b***.

The engine system 4 can be represented by a transfer function M(z) which has, among other things, a delay time solely due to the process of combustion, exhaust, transport of the gases, response of the probe and filtering of the signal.

With reference to the block diagram of FIG. **3*a*, the engine 4 is initially made to operate at a pre-defined operating point, i.e. with constant and pre-defined number of revolutions and supply pressure (block 100**).

The block 100 is followed by a block 110 in which the engine 4 is energized with a square-wave injection time signal Tj which serves to energize the engine system.

The square-wave energizing signal Tj may be of the PBRS type (PSEUDO BINARY RANDOM SEQUENCE).

The block 110 is followed by a block 120 in which, by means of the U.E.G.O. probe 45, the output of the engine system is obtained. This output is a square wave which is dephased (and inverted) with respect to the input energizing signal by a time which represents the response delay introduced by the engine system.

The block 120 is followed by a block 130 in which the input signal to the engine system is filtered by means of a characteristic which represents the response of the U.E.G.O. probe 45.

The block 130 is followed by a block 140 in which, the delay introduced by the engine system being recognized, the synchronization between the energizing signal filtered by the block 130 and the output signal is carried out. The pure delay time is eliminated from the transfer function M(z) in this way and the engine system is thus described by the film/fluid equations [1] in which the digital coefficients X and tau are unknown.

The block 140 is followed by a block 150 in which the coefficients X and tau are identified by means of customary iterative mathematical methods, the input (energizing square wave), the output of the engine system (recorded by the U.E.G.O. probe 45) and the equations [1] being known. All the other engine parameters are kept constant in the course of the phases described.

The experimental trials carried out previously are then repeated at a low engine temperature (cold engine) or during the warm-up phase in order to identify the parameters X and tau in cold conditions.

The parameters X and tau calculated in hot and cold conditions are stored and used by the block 57.

With particular reference to FIG. **3*b*, the logic block diagram of the calculation operations carried out in order to determine the parameters capable of describing the characteristic implemented in the block 140** is illustrated.

With reference to FIG. **3*b*, the engine 4 is initially made to operate at a pre-defined operating point, i.e. at a constant and pre-defined number of revolutions and supply pressure (block 200**).

In particular, the engine is made to operate at a number of revolutions which is sufficiently high (usually N>4000 rpm) and such that the phenomenon of the dynamic variation of the "film/fluid" fuel layer deposited on the manifold can be regarded as negligible.

The block 200 is followed by a block 210 in which the engine 4 is energized with a square-wave injection time signal Tj which serves to energize the engine system.

The square-wave energizing signal Tj may be of the PBRS type (PSEUDO BINARY RANDOM SEQUENCE).

The block 210 is followed by a block 220 in which, by means of the U.E.G.O. probe 45, the output of the engine system is obtained. This output is a square wave which is dephased (and inverted) with respect to the input energizing signal by a time which represents the response delay introduced by the engine system.

The block 220 is followed by a block 230 in which, the delay introduced by the engine system being recognized, the synchronization between the energizing signal and the output signal is carried out. The pure delay time is eliminated from the transfer function M(z) in this way.

The block 230 is followed by a block 240 in which the parameters which define the transfer function of the U.E.G.O. probe 45 are identified by means of customary iterative mathematical methods, the input (energizing square wave), the output of the engine system being known and the "film/fluid" phenomenon described by the equations [1] being regarded as negligible.

The parameters recorded in the block 240 are used by the block 130 to define the characteristic of the U.E.G.O. probe 45.

Thus the advantages of the invention, in that it enables the dynamic variations of the "film/fluid" film of fuel deposited on the walls of the manifold to be compensated for and at the same time eliminates the response inertia of the system, assuring a correct air/petrol metering including during the transients of the engine, will be clear.

The system according to the invention ensures that the air/petrol ratio of the mixture supplied to the combustion chamber is kept equal to a desired value for each operating condition of the engine and also in the course of situations which are not stationary (typically accelerations and decelerations) thanks to the compensation of the dynamic variations of the fuel film on the walls of the manifold and the making-up of the delays due to the electronic management of the engine.

The emissions of harmful gases, the fuel consumption are reduced, the stresses on the catalytic converter are reduced, so preserving its efficiency over time, and drivability is improved.

The mathematical algorithms used (expressions [2] and [3]) are also extremely simple.

The calibration of the unit 7 (calculation of X and tau) is also carried out off-line and in a wholly automatic way. The setting-up of the system is therefore speeded up.

Finally it will be clear that modifications and variants may be introduced to the system described without departing from the scope of the invention.

The electronic unit 7, for example, could also comprise a circuit 100 (shown in FIG. 1) to calculate the engine advance angle (theta).

The calculation circuit 100 could receive as input a multiplicity of data signals, including, for example, the number of revolutions N of the engine, together with the signal which is a measure of the correct engine load from the reconstructive circuit 47.

We claim:

1. Electronic system for calculating injection time comprising:

an electronic unit (7) receiving as input a multiplicity of data signals (N, $T_{H2O}$, Pfarf, Taria) measured in an endothermic engine (4);

said electronic unit (7) receiving as input an engine load signal which is a measure of the engine load (P) generated by an engine load sensor (36);

said electronic unit (7) being capable of generating an injection time (Tjeff) for a multiplicity of injectors (40);

said electronic unit (7) comprising reconstructive means (47) receiving as input said engine load signal (P) together with at least some (N, $T_{H2O}$) of said data signals;

said reconstructive means (47) being capable of generating as output a correct engine load signal (Pric) which is a measure of the correct engine load which compensates for the response delays of said engine load sensor (36), the system processing delays and the delays due to the actuation of the injection;

said reconstructive means (47) being capable of supplying said correct engine load signal (Pric) to electronic calculation means (51) generating as output an intermediate injection time (Tjin);

said electronic unit (7) also comprising electronic means of compensation for dynamic film/fluid variation (57) receiving as input said intermediate injection time (Tjin) and generating as output a correct injection time (Tjcorr);

said electronic means of compensation for dynamic film/fluid variation (57) comprising means (80, 84, 87, 85, 93) capable of compensating for the variation in the mixture supplied to a combustion chamber (42) due to the dynamic variation of a layer of fuel deposited on the walls of an intake manifold.

2. System according to claim 1, wherein said engine load sensor comprises a pressure sensor (36), said pressure sensor disposed in an intake manifold (32) of the said engine (4) and capable of generating a pressure signal;

said reconstructive means being in the form of reconstructive pressure means (47) receiving as input said pressure signal (P) together with at least some (N, $T_{H2O}$) of said data signals;

said reconstructive pressure means (47) being capable of generating as output a correct pressure signal (Pric) which compensates for the response delays of said pressure sensor (36), the system processing delays and the delays due to the actuation of the injection;

said reconstructive pressure means (47) being capable of supplying said correct pressure signal (Pric) to said electronic calculation means (51).

3. System according to claim 1, wherein said reconstructive means (47) comprises first adder means (64) having a first input (64*a*) which receives a signal (Pfarf) generated by an auxiliary sensor (28), said auxiliary sensor capable of monitoring the opening of a throttle valve (30);

first modelling means (67) having an input (67*a*) connected to an output of said first adder means (64);

said first modelling means (67) performing a first transfer function (A(z)) which models a means of transmission, in particular the portion of said intake manifold (32) between said throttle valve (30) and said engine load sensor (36);

second modelling means (69) having an input (69*a*) connected to an output (67*u*) of said first modelling means (67);

said second modelling means (69) performing a second transfer function (B(z)) which models the delays of said engine load sensor (36), the system processing delays and the delays due to the actuation of the injection;

second adder means (71) having a first input (71*b*) which receives said engine load signal (P) including all the system delays and a second input (71*a*) which receives an output (69*u*) of said second modelling means (69);

said second adder means (71) generating as output (71*u*) an error signal supplied to a compensation network (74) comprising a P.I.D. (proportional integral derivative) network, said P.I.D. network having an output (74*u*) capable of supplying a reaction signal (C) to a second input (64*b*) of said first adder means (64);

said reconstructive pressure means (47) generating at the output (67*u*) of said first modelling means (67) said correct engine load signal (Pric).

4. System according to claim 3, wherein said first modelling means (67) comprises a digital filter implementing said first transfer function (A(z)).

5. System according to claim 3, wherein said second modelling means (69) comprises a digital filter implementing said second transfer friction (B(z)).

6. System according claim 1, wherein said electronic means of compensation for dynamic film/fluid variation (57) comprises first calculation means (80) having an input (80*a*) which receives an input (57*d*) of said electronic compensation means (57) and an output connected to a first input (82*a*) of a third adder means (82);

second calculation means (84) having an input (84*a*) which receives an output (82*u*) of said third adder means (82) and an output (84*u*) connected to an input (87*a*) of a third calculation means (87);

fourth calculation means (85) having an input connected to said output (84*u*) of said second calculation means (84) and an output (85*u*) connected to a second input (82*b*) of said third adder means (82);

fourth adder means (90) having a first input (90*a*) connected to an output (87*u*) of said third calculation means (87);

fifth calculation means (93) having an input connected to said input (57*d*) of said electronic compensation means (57) and an output (93*u*) connected to a second input (90*b*) of said fourth adder means (90);

said fourth adder means (90) having an output forming an output (57*u*) of said electronic compensation means (57).

7. System according to claim 6, wherein said first (80), third (87), fourth (85) and fifth (93) calculation means produce respective coefficients Bd, Cd, Ad and Dd defined as:

$$Ad=[1-polofi*DT];$$

$$Bd=[X*polofi*DT]/[1-X]; \quad [3]$$

$$Cd=[-1];$$

and $$Dd=[1]/[1-X]$$

where:

X represents the percentage of fuel which is deposited on the walls of the manifold, tau represents a time constant of evaporation from the fuel film deposited on the manifold, polofi is defined as [1]/[tau*(1−X)], DT represents a sampling step and said second calculation means (84) produces a unitary delay.

8. System according to claim 1, wherein said electronic film/fluid compensation means performs an input/output transfer function of the type:

$$output=Dd*(input)+Cd*(Bd/(Z-Ad))*(input) \quad [1]$$

where Bd, Ad, Cd and Dd are multiplication coefficients Bd, Cd, Ad and Dd defined as:

$$Ad=[1-polofi*DT];$$

$$Bd=[X*polofi*DT]/[1-X]; \quad [3]$$

$$Cd=[-1];$$

and $$Dd=[1]/[1-X]$$

where:

X represents the percentage of fuel which is deposited on the walls of the manifold, tau represents a time constant of evaporation from the fuel film deposited on the manifold, polofi is defined as [1]/[tau*(1−X)], DT represents a sampling step and Z represents a unitary delay.

9. System according to claim 1, wherein a film/fluid phenomenon can be represented in the continuum according to a system of two equations, of the type:

$$dmff/dt=(1/tau)*(X*mfi-mff) \quad [1]$$

$$mfe=(1-X)*mfi+mff$$

where mfi represents the quantity of fuel physically supplied by said injectors (40), mfe represents a quantity of fuel actually introduced into the combustion chamber (42), and mff represents a quantity of fuel which evaporates from the fuel film layer deposited on the walls of the manifold, said film/fluid phenomenon capable of being represented in terms of the frequency, by a transfer function H(s), of the zero pole type, which can be obtained from said system of equations, wherein in discrete terms said electronic compensation means (57) performs a transfer function $H(s)^{-1}$ complementary to said transfer function H(s), with $H(s)^{-1}*H(s)$ the said transfer function H(s), with $H(s)^{-1}*H(s)=I(s)$ the unitary transfer function.

10. System according to claim 9, further comprising interpolatory means capable of obtaining experimentally the values of percentage X of fuel which is deposited on the walls of the manifold and of the time constant tau of evaporation from the fuel film layer deposited on the manifold; said interpolatory means being capable of:

applying (110) to the engine (4) a square-wave energizing signal comprising a square-wave injection time signal (Tj);

measuring (120) an output of the engine (4), recording a response delay introduced by the engine (4);

modelling the engine with a transfer function M(z) and eliminating (140) from said transfer function M(z) a time corresponding to said response delay;

obtaining the coefficients X and tau by means of iterative mathematical methods (150) applied to said transfer function minus said response delay using said energizing signal and said output of the engine (4).

11. System according to claim 10, wherein said interpolatory means is capable of measuring (120) an output of the engine (4) by means of a probe (45) capable of monitoring the composition of the exhaust gases in order to obtain the percentage of the air/petrol mixture supplied to the engine (4).

12. System according to claim 4, wherein said first modelling means (67) comprises a low pass filter.

13. System according to claim 5, wherein said second modelling means (69) comprises a low pass filter.

* * * * *